United States Patent
Fugel et al.

(10) Patent No.: US 8,714,833 B2
(45) Date of Patent: May 6, 2014

(54) RADIAL CAGE FOR CYLINDRICAL ROLLER BODIES

(71) Applicant: Schaeffler Technologies AG & Co. KG, Herzogenaurach (DE)

(72) Inventors: Wolfgang Fugel, Nürnberg (DE); Volker Ploetz, Herzogenaurach (DE); Martin Gegner, Langenfeld (DE); Jesko Jaekel, Kalchreuth (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/628,514

(22) Filed: Sep. 27, 2012

(65) Prior Publication Data
US 2013/0182990 A1    Jul. 18, 2013

(30) Foreign Application Priority Data
Nov. 3, 2011    (DE) .......................... 10 2011 085 716

(51) Int. Cl.
*F16C 33/48* (2006.01)
*F16C 33/54* (2006.01)

(52) U.S. Cl.
USPC .......................................... 384/572; 384/575

(58) Field of Classification Search
USPC ................. 384/572, 575, 580; 29/898.065, 29/898.067
See application file for complete search history.

(56) References Cited

U.S. PATENT DOCUMENTS

| | | | |
|---|---|---|---|
| 3,240,542 A | 3/1966 | Jahn | |
| 3,298,761 A | 1/1967 | Schaeffler | |
| 3,442,562 A * | 5/1969 | Teufel et al. | 384/575 |
| 5,391,005 A * | 2/1995 | Alling | 384/575 |
| 5,826,988 A | 10/1998 | Furukawa et al. | |
| 6,007,254 A * | 12/1999 | Fujioka et al. | 384/572 |
| 6,648,519 B2 | 11/2003 | Fugel et al. | |
| 7,210,854 B2 * | 5/2007 | Ince et al | 384/575 |
| 7,419,307 B2 * | 9/2008 | Winzeler et al. | 384/572 |
| 2002/0181821 A1 * | 12/2002 | Fugel et al. | 384/572 |
| 2005/0254742 A1 * | 11/2005 | Shibano et al. | 384/580 |
| 2009/0003751 A1 * | 1/2009 | Auffahrt | 384/575 |
| 2009/0215583 A1 * | 8/2009 | Urakami et al. | 475/348 |
| 2010/0278471 A1 * | 11/2010 | Oishi et al. | 384/572 |
| 2010/0322549 A1 * | 12/2010 | Brown et al. | 384/572 |

FOREIGN PATENT DOCUMENTS

| | | |
|---|---|---|
| DE | 1174113 B | 7/1964 |
| DE | 10143089 A1 | 3/2003 |
| DE | 10 2008 026 562 A1 | 12/2009 |
| EP | 1262256 A1 | 12/2002 |
| EP | 2098738 A1 | 9/2009 |
| EP | 2103825 A1 | 9/2009 |
| JP | 2006-153200 A | 6/2006 |
| JP | 2006-242199 A | 9/2006 |

* cited by examiner

*Primary Examiner* — Phillip A Johnson
(74) *Attorney, Agent, or Firm* — Fitzpatrick, Cella, Harper & Scinto

(57) ABSTRACT

A radial cage in which roll forming is carried out in such a manner that straight side sections of all axial crossbars continue to have at least approximately a material thickness of a starting material for the radial cage, while side rings of the radial cage and axial center sections of the axial crossbars are implemented by rolling down during roll forming to each have material thicknesses that are smaller than the material thickness of the straight side sections and that reduce their centrifugal mass.

6 Claims, 2 Drawing Sheets

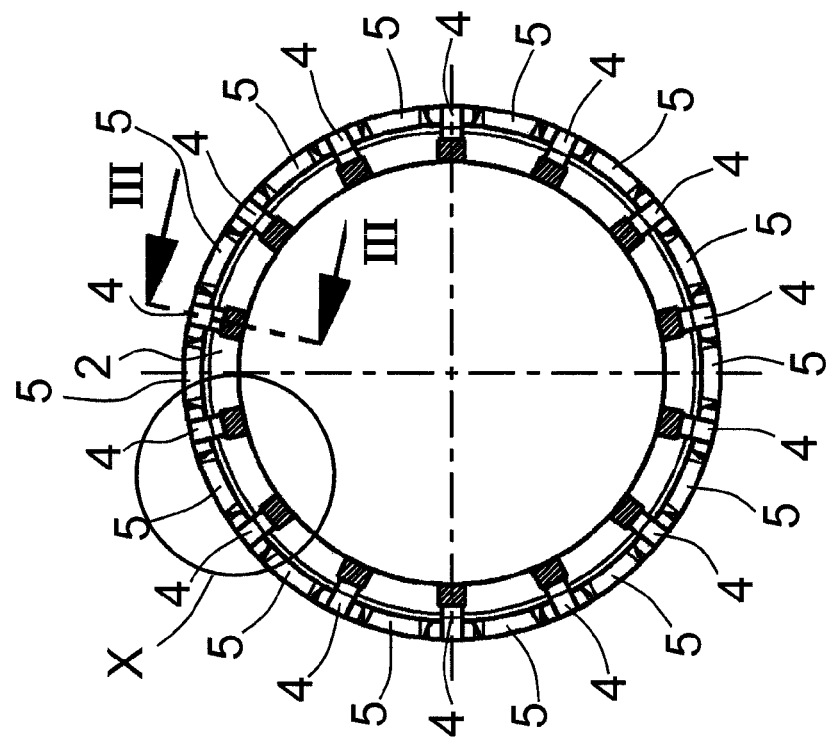
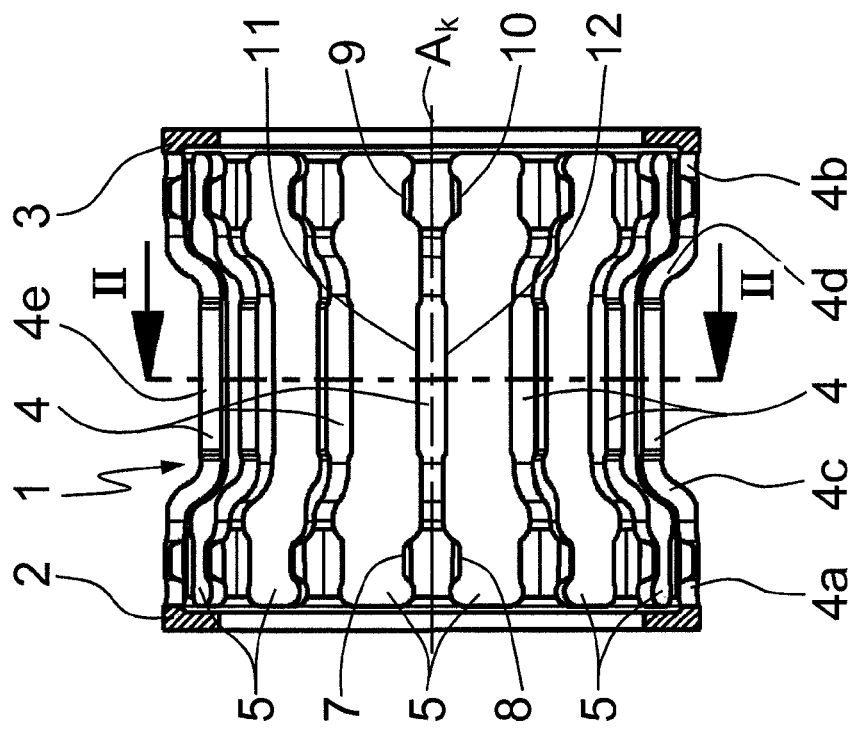

RADIAL CAGE FOR CYLINDRICAL ROLLER BODIES

FIELD OF THE INVENTION

The invention concerns a radial cage for cylindrical rolling elements having side rings, axial crossbars, and pockets to accommodate the cylindrical rolling elements. The cage can be implemented to particular advantage in the cages of needle roller and cage assemblies intended for applications with very high rotational speeds.

BACKGROUND OF THE INVENTION

Conventional needle roller and cage assemblies are single-row or double-row constructional units that consist of just a radial cage and a plurality of needle rollers, and are characterized primarily by a lowest possible overall radial height relative to the diameter of the needle rollers. Moreover, needle roller and cage assemblies produce bearings with high load capacity and high runout accuracy, which can also accommodate high centrifugal and acceleration forces. A generic needle roller and cage assembly of this type is known from EP 1,262,256 A1, for example, and consists essentially of two side rings that define the axial length of the radial cage and of a plurality of profiled axial crossbars that connect these side rings to one another at their outer diameters, with a plurality of pockets for accommodating the needle rollers formed between the crossbars. In this design, the axial crossbars are each composed of two axially straight side sections connected to the side rings, of two intermediate sections extending at an angle to the longitudinal axis of the cage, and of an axial center section, so that the needle rollers are held in the radial cage by the bottom edges of the side sections designed with angled stop faces and by the top edges of the center section of each axial crossbar.

Since such needle roller and cage assemblies generally are suitable for high rotational speeds for design reasons, they are used primarily for planetary gear bearings in the planetary gear trains of automatic transmissions in motor vehicles, and for connecting rod bearings and small end bearings of connecting rods in internal combustion engines. However, in newer generations of automatic transmissions, where the input speeds on the engine side are ever more frequently being stepped up to higher speeds, and the gear ratio speeds are often beyond 10,000 RPM, it has been shown that the increased loads resulting from the high rotational speeds have led to increased crossbar breakage in the vicinity of the straight side sections of the axial crossbars of the radial cage, and thus to failure of the needle roller and cage assemblies. The cause of this was identified as the fact that the radial cage is so strongly loaded by the intermittently acting, extremely high centrifugal forces that its axial crossbars bend outward due to their net mass, thereby causing braking of the needle rollers, and under some circumstances even blocking of the needle rollers. In combination with the support forces of the needle rollers on the side sections, this can then lead to the said crossbar breakage in the vicinity of the straight side sections of the axial crossbars of the radial cage, which then resulted in blocking of the needle roller and cage assembly and of the supported planetary gear, and thus in malfunctions of the entire automatic transmission.

To avoid these crossbar breakages, DE 10 2008 026,562 A1 thus proposed designing the axial center sections of each of the axial crossbars of the radial cage to have, in their center regions, an additional subsection extending to the dimension of the outer diameter of the side rings. This measure was intended to achieve the result that the center sections of the axial crossbars are supported on the inside circumferential surface of the bearing seat under high centrifugal loading, thereby reducing bending of the axial crossbars to a minimum.

However, in practice it has been shown that although it was possible to reduce the frequency of crossbar breakage at the radial cages with such a measure, this type of crossbar breakage nevertheless continues to occur sporadically. Further investigations in this regard have shown that the cause thereof can be found in the particular pocket geometry in conjunction with the size of the stop faces for the needle rollers on the axial crossbars impressed on the bottom edges of the straight side sections. Since these side sections, like the side rings and the other sections of the axial crossbars of the radial cage, have a uniform material thickness that is smaller than the material thickness of the starting material due to the roll forming process of the radial cage, the angled stop faces do not have the height necessary for full-area contact with the needle rollers, but instead, the needle rollers run against only the bottommost edge of the stop faces on the side sections of the axial crossbars. As a result, increased wear occurs both at the ends of the needle rollers and at the side sections of the axial crossbars of the radial cage, which causes the transverse forces acting during bearing operation to be further intensified and to be transmitted to the side sections of the axial crossbars by the simultaneous contact of the needle rollers with the center sections of the axial crossbars via the leverage of the needle rollers that is now possible. As a result, further advancing wear of the side sections of the axial crossbars then occurs, ultimately ending in the said crossbar breakage of the radial cage and the resultant consequential damage.

OBJECT OF THE INVENTION

Proceeding from the described disadvantages of prior art solutions, therefore, the object of the invention is to design a radial cage with cylindrical rolling elements that reliably avoids the crossbar breakage of the axial crossbars that occurs at high rotational speeds and the resultant consequential damage.

DESCRIPTION OF THE INVENTION

According to the invention, this object is attained in a radial cage by the means that the roll forming of the radial cage is carried out in such a manner that the straight side sections of all axial crossbars continue to have at least approximately the material thickness of the starting material for the radial cage, while the side rings of the radial cage and the axial center sections of the axial crossbars are each implemented by rolling down during roll forming to have material thicknesses that are smaller than the material thickness of the straight side sections and that reduce their centrifugal mass.

Preferred embodiments and refinements of the radial cage designed according to the invention are described throughout the description below.

Accordingly, another example aspect of the invention is that provision is made in the radial cage designed according to the invention that the straight side sections of the axial crossbars can be implemented with stop faces for the rolling elements that are enlarged in the direction of the rolling element pitch circle by maintaining the material thickness of the starting material. This means that, in addition to the effect of increasing the strength of the axial crossbars, avoiding weakening of the material of the side sections additionally produces the advantage that the angled stop faces for the rolling elements impressed on the bottom edges of the side sections extend deeper in the direction of the rolling element pitch circle than in radial cages with uniformly reduced material thickness, by which means the desired area contact of the rolling element with the stop faces can now be reliably achieved.

A further example aspect of the invention is that the axial center section of each axial crossbar is additionally designed with a subsection in its center region projecting to the dimension of the outside diameter of the side rings. Such a measure has proven especially advantageous, chiefly in radial cages with long, cylindrical rolling elements, in order to avoid a bending of the cross-sectionally weakened axial center sections of the axial crossbars under high centrifugal loading by the means that the center sections can be supported with the projecting subsections on the inner circumferential surface of the bearing seat, in a manner similar to the radial cage in DE 10 2008 026,562 A1.

A further example aspect of the invention is that the intermediate sections of the axial crossbars are designed to be uniformly tapered from the material thickness of the side sections to the material thickness of the center section of every axial crossbar. Such a design has proven to be the most advantageous, especially with regard to production technology, and at the same time ensures that all forces acting on the center sections of the axial crossbars are uniformly transmitted through the intermediate sections into the side sections of the axial crossbars.

Furthermore, a useful refinement is that the radial cage is designed as a round-rolled and welded, stamped and formed component made from a steel strip starting material in which the final material thickness of the side rings is produced by finish grinding. Such a method of manufacturing a steel radial cage has proven to be the most economical in terms of the resulting production costs, with it also being possible, however, to manufacture such a radial cage from a plastic by means of injection molding.

Lastly, it is also proposed as a preferred application of the radial cage designed for it to be used for planetary gear bearings in the planetary gear trains of automatic transmissions in motor vehicles or for connecting rod bearings and small end bearings of connecting rods in internal combustion engines. The advantages of the radial cage according to the invention come to bear especially clearly in these applications, since the speed-induced loads are especially high here.

In summary, the radial cage designed according to the invention thus has the advantage as compared to radial cages known from the prior art that it is designed with a targeted strengthening—by maintaining the material thickness of the starting material—of the side sections of its axial crossbars, which are particularly affected by wear, and is designed with a targeted weakening—by rolling down the material thickness—of the center sections of its axial crossbars, which are particularly affected by centrifugal loading, by which means the breakage of the axial crossbars occurring at high rotational speeds and the resultant consequential damage are reliably avoided. At the same time, the thus strengthened side sections of the axial crossbars have the effect that the angled stop faces for the rolling elements impressed on the bottom edges of the side sections can be made larger than in radial cages with uniformly reduced material thickness, ensuring a low-wear area contact of the rolling elements with the stop faces.

BRIEF DESCRIPTION OF THE DRAWINGS

A preferred embodiment of the radial cage designed in accordance with the invention is described in detail below with reference to the attached drawings. Shown are:

FIG. 1 a cross-section through a radial cage designed in accordance with the invention;

FIG. 2 the section II-II from FIG. 1 through the radial cage designed in accordance with the invention;

DETAILED DESCRIPTION OF THE DRAWINGS

Figure 4:
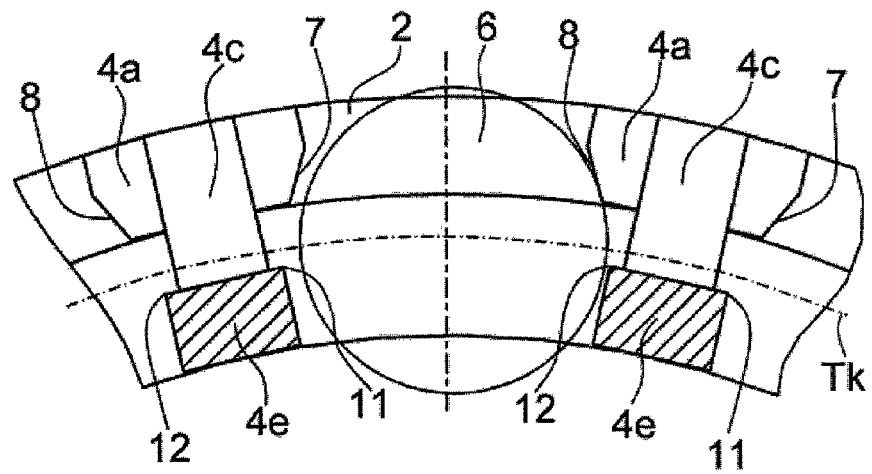
FIG. 4 an enlarged representation of a pocket of the radial cage according to the invention in accordance with detail X in FIG. 2.

Visible in FIGS. 1 and 2 are two views of a radial cage 1 designed as a needle roller cage for cylindrical rolling elements 6, as is used for planetary gear bearings in the planetary gear trains of automatic transmissions in motor vehicles, or for connecting rod bearings and small end bearings of connecting rods in internal combustion engines. This radial cage 1 consists, in a known manner, essentially of two side rings 2, 3 that define the axial length of the radial cage 1 and of a plurality of axial crossbars 4 that connect these side rings 2, 3 to one another at their outer diameters, with a plurality of pockets 5 for accommodating the cylindrical rolling elements 6 formed between the crossbars. It is clearly visible that the axial crossbars 4 here each have, due to roll forming, two axially straight side sections 4a, 4b connected to the side rings 2, 3, two intermediate sections 4c, 4d extending at an angle to the longitudinal axis $A_K$ of the cage, and an axially straight center section 4e, so that the rolling elements 6, as shown in FIG. 4, are radially held in the radial cage 1 by the bottom edges of the side sections 4a, 4b designed with angled stop faces 7, 8, 9, 10 and by the top edges 11, 12 of the center section 4e of each axial crossbar 4.

Figure 3:
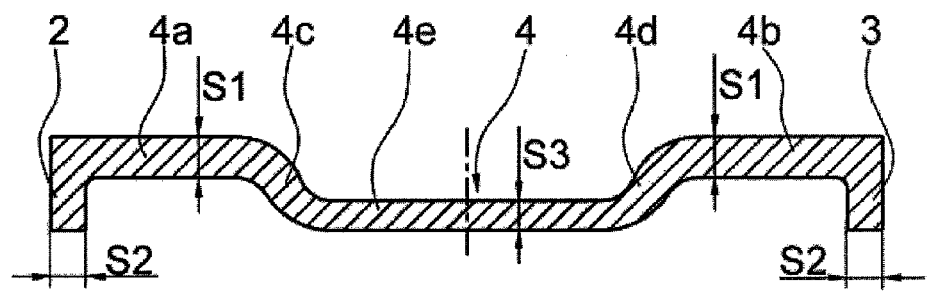
FIG. 3 an enlarged view of an axial crossbar of the radial cage according to the invention along the section III-III in FIG. 2.

The section through one of the axial crossbars 4 of the radial cage 1 shown in FIG. 3 along III-III from FIG. 2 makes it clear, moreover, that in this radial cage 1, the roll forming of the radial cage 1 is carried out according to the invention in such a manner that the straight side sections 4a, 4b of all axial crossbars 4 continue to have at least approximately the material thickness S1 of the starting material for the radial cage 1, while the side rings 2, 3 of the radial cage 1 and the axial center sections 4e of the axial crossbars 4 are each implemented by rolling down during roll forming to have material thicknesses S2, S3 that are smaller than the material thickness S1 of the straight side sections 4a, 4b and that reduce their centrifugal mass. In like manner, it is evident from FIG. 3 that the intermediate sections 4c, 4d of the axial crossbars 4 are designed to taper uniformly from the material thickness S1 of the side sections 4a, 4b to the material thickness S3 of the center section 4e of each axial crossbar 4. The radial cage 1 implemented in this way is implemented here as a round-rolled, welded, stamped and formed component made of a steel strip starting material in Which the final material thickness S2 of the side rings 2, 3 is produced by finish grinding. In this way, with the targeted strengthening—achieved by maintaining the material thickness of the starting material—of the side sections 4a, 4b of the axial crossbars 4, which are particularly affected by wear, and with the targeted weakening—achieved by rolling down the material thickness—of the center sections 4e of the axial crossbars 4, which are particularly affected by centrifugal loading, the breakage of the axial crossbars 4 previously arising at high rotational speeds, and the resultant consequential damage, are reliably avoided. At the same time, the straight side sections 4a, 4b of the axial crossbars 4 can be implemented with stop faces 7, 8, 9, 10 for the rolling elements 6 that are enlarged in the direction of the rolling element pitch circle Tk due to their greater material thickness S1, as is evident in FIG. 4, ensuring a low-wear area contact of the rolling elements 6 with the stop faces 7, 8, 9, 10.

LIST OF REFERENCE NUMERALS 1 radial cage
2 side ring
3 side ring
4 axial crossbars
4a side section of 4
4b side section of 4
4c intermediate section of 4
4d intermediate section of 4
4e center section of 4
5 pockets
6 rolling element
7 stop face on 4a
8 stop face on 4a
9 stop face on 4b
10 stop face on 4b
11 top edge of 4e
12 top edge of 4e
S1 material thickness of 4a, 4b
S2 material thickness of 2, 3
S3 material thickness of 4e
Tk rolling element pitch circle
$A_K$ longitudinal axis of cage

The invention claimed is:

1. A radial cage for cylindrical rolling elements, comprising:
   two side rings that define the axial length of the radial cage;
   a plurality of axial crossbars that connect these side rings to one another at their outer diameters; and
   a plurality of pockets for accommodating the cylindrical rolling elements, the plurality of pockets being formed between the crossbars,
   wherein the plurality of axial crossbars are each made, through roll forming, to consist of two axially straight side sections connected to the side rings, two intermediate sections extending at an angle to the longitudinal axis of the radial cage, and an axial center section,
   wherein the rolling elements are radially held in the radial cage by bottom edges of the straight side sections designed with angled stop faces and by top edges of the axial center section of each of the plurality of axial crossbars, and
   wherein the straight side sections of all of the plurality of axial crossbars have a uniform material thickness extending to a respective side ring, while the side rings of the radial cage and the axial center sections of the axial crossbars have material thicknesses that are smaller than the material thickness of the straight side sections and that reduce their centrifugal mass.

2. The radial cage according to claim 1, wherein the angled stop faces of the axially straight side sections have an increased thickness in a direction of a rolling element pitch circle.

3. The radial cage according to claim 1, wherein the intermediate sections of the axial crossbars are uniformly tapered from the material thickness of the side sections to the material thickness of the center section of every axial crossbar.

4. The radial cage according to claim 1, which is a welded component in which the final material thickness of the side rings is produced by finish grinding.

5. A planetary gearing bearing, connecting rod bearing or small end bearing comprising the radial cage according to claim 1.

6. A method of manufacturing the radial cage for cylindrical rolling elements according to claim 1, comprising the steps of:
   forming each of the axial crossbars by roll forming a steel strip starting material, so as to reduce a material thickness of the axial center section while maintaining a material thickness of the straight side sections of the respective axial crossbar;
   forming each of the side rings by roll forming the steel strip starting material, so as to reduce a material thickness of the respective side ring;
   welding said axial crossbars to the side rings to form said radial cage.

* * * * *